United States Patent

Mitsuhashi et al.

Patent Number: 4,910,629
Date of Patent: Mar. 20, 1990

[54] MAGNETIC HEAD

[75] Inventors: Daisuke Mitsuhashi, Tokyo; Noboru Komori, Kanagawa, both of Japan

[73] Assignee: Fuji Photo Film Co., Ltd., Kanagawa, Japan

[21] Appl. No.: 252,306

[22] Filed: Oct. 3, 1988

[30] Foreign Application Priority Data

Oct. 2, 1987 [JP] Japan ................ 62-248138

[51] Int. Cl.$^4$ ............ G11B 5/265; G11B 5/187
[52] U.S. Cl. ............................. 360/121; 360/122
[58] Field of Search ........................... 360/121, 122

[56] References Cited

U.S. PATENT DOCUMENTS 4,713,709 12/1987 Yasuda et al. .................. 360/121

Primary Examiner—Robert S. Tupper
Attorney, Agent, or Firm—Sughrue, Mion, Zinn, Macpeak & Seas

[57] ABSTRACT

In order to attain a good contact with a magnetic sheet, a magnetic head with a pair of magnetic gaps has an external configuration and a sliding surface which satisfy formulas of:

$$0.2 < W_R/W_T < 0.8,$$

$$-0.2 W_T W_C + 0.9 < W_R W_T < -0.17 W_T W_C + 1.2,$$

and $$1.5 < R_W/R_R < 4.4,$$

where $W_R$ and $W_T$ are lengths of the magnetic head in a rotational direction and in a track-width direction of the magnetic sheet, respectively, $W_C$ is a distance between the magnetic gaps and $R_W$ and $R_R$ are radii of curvatures of the sliding surface in the track-width direction and in the rotational direction, respectively.

4 Claims, 5 Drawing Sheets

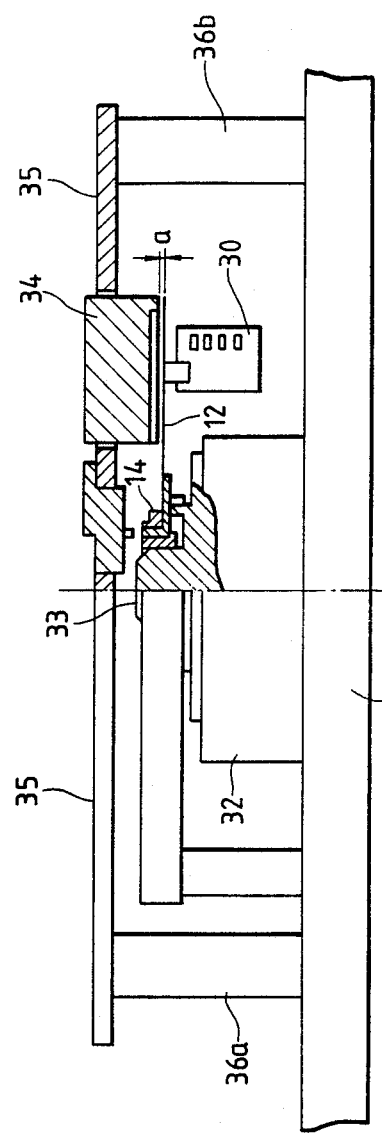
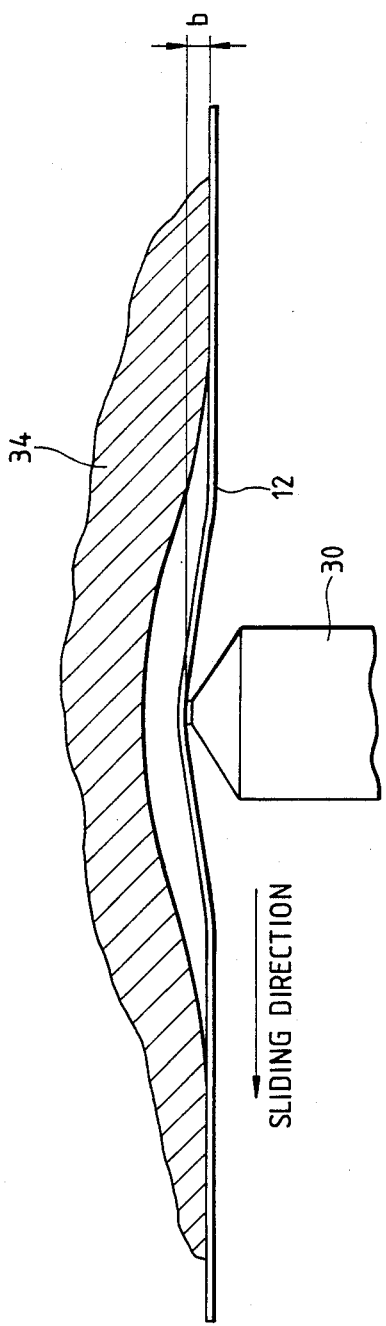
FIG. 4
FIG. 5

MAGNETIC HEAD

BACKGROUND OF THE INVENTION

The present invention is generally directed to a magnetic head in which a pair of magnetic gaps are disposed in parallel, and more particularly, to a magnetic head suited to record an image into and reproduce an image from a magnetic recording medium such as a rotary magnetic sheet or the like.

Recently, an electronic still camera system has been developed and much attention is given to it. This type of system is typically arranged such that: an object to be imaged is electronically still-photographed by a combination of an imaging device such as a solid imaging device and an image pickup tube, and a recording device employing an inexpensive magnetic sheet as a recording medium, the recording capacity of which is relatively large; the still-photographed image is then recorded on the rotary magnetic sheet; and reproduction of the recorded image is effected by a separately provided television system or a printer.

A 2CH (channel) magnetic head is used for recording an image signal into the magnetic sheet and reproducing it therefrom. There are caused some problems inherent in such a magnetic head.

To be specific, in the case of recording and reproducing the image, the magnetic head is brought into contact with the magnetic sheet which rotates at a high speed. At this time, the magnetic head comes into contact with the magnetic sheet while protruding the magnetic head towards the magnetic sheet, and it follows that the magnetic sheet near the contact position is curved in accordance with an amount of protrusion thereof.

As a result, a condition of contact between a magnetic gap formed in a slide surface of the magnetic head and the magnetic sheet recording surface is likely to be deteriorated. In some cases, this may lead to a recording or reproducing mistake. In order to eliminate the above-mentioned problems, there is proposed a magnetic head in which the sliding surface of the head is formed in a spherical configuration. This method does not, however, provide a satisfactory approach to such problems.

When the magnetic head is in contact with the magnetic sheet, angular portions of the magnetic head impinge upon the recording surface of the magnetic sheet. Then, a degree to which the magnetic sheet is curved fluctuates, and the contact between the magnetic gaps and the magnetic sheet is thereby deteriorated. Therefore, the recording/reproducing process can not stably be performed. The unnecessary impingement of the magnetic head upon the magnetic sheet may damage the magnetic sheet. This also may be one of the reasons why an amount of abrasion of the magnetic head augments.

The magnetic sheet contacts the magnetic head when rotating, and simultaneously the magnetic head moves in a track-width direction (radial direction). Therefore, a configuration and a size of the magnetic head and the spherical shape of the head slide surface are required to be examined in at least two directions, i.e., the magnetic sheet rotational direction and the track-width direction.

SUMMARY OF THE INVENTION

Accordingly, it is a primary object of the present invention to provide a magnetic head capable of stably effecting recording/reproducing operations by realizing good contact between the magnetic head and a magnetic sheet.

To this end, according to the invention, a configuration and size of the magnetic head are determined with referring to a protrusion amount, a distance between a pair of magnetic gaps, etc. as in the following formulas:

$$0.2 < W_R/W_T < 0.8$$

and $$-0.21 W_T/W_C + 0.9 < W_R/W_T < -0.17 W_T/W_C + 1.2$$

where $W_R$ and $W_T$ are lengths of the magnetic head in a rotational direction of the magnetic sheet and in a track-width direction, respectively, and $W_C$ is a distance between the magnetic gaps.

Moreover, a curvature of a sliding surface of the magnetic head is determined as:

$$1.5 < R_W/R_R < 4.4$$

where $R_W$ and $R_R$ are radii of curvature of the sliding surface of the magnetic head in the track-width direction and in the rotational direction of the magnetic sheet, respectively.

In accordance with the present invention, it is possible to obtain a favorable condition of contact between the magnetic head and the magnetic sheet, because the conditions under which the magnetic head is brought into contact with the magnetic sheet are totally examined.

The foregoing and other objects, features and advantages of the invention will become manifest to one skilled in the art upon making reference to the detailed description which follows and the accompanying drawings.

BRIEF DESCRIPTION OF THE DRAWINGS

FIG. 4 is a partial sectional view showing a relation between a magnetic head and the magnetic sheet in a rotary magnetic sheet device;

FIG. 5 is an enlarged sectional view showing a contact portion between the magnetic head and the magnetic sheet;

DETAILED DESCRIPTION OF THE PREFERRED EMBODIMENTS

Preferred embodiments of a magnetic head according to the present invention will hereinafter be described with reference to the accompanying drawings.

Figure 1:
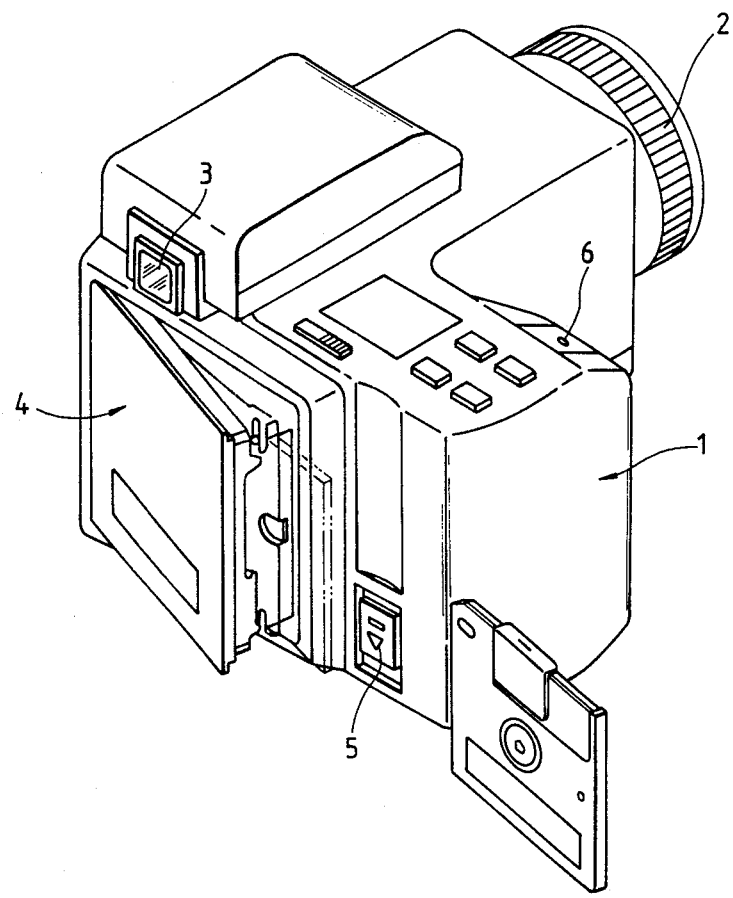
FIG. 1 is a perspective view depicting an external appearance of an electronic still camera to which the present invention is applied.

Turning now attention to FIG. 1, there is illustrated an entire configuration of an electronic still camera to which the present invention is applied. The reference numeral 1 denotes a camera body; 2, a photographing lens barrel; 3, a viewfinder; 4, a rotary magnetic sheet device; 5, a knob for opening and closing a bucket of the rotary magnetic sheet device 4; and 6, a shutter release button of an electronic still camera.

Next, a structure of a magnetic sheet pack mounted on the rotary magnetic sheet device 4 will be explained with reference to FIGS. 2 and 3.

Figure 2:
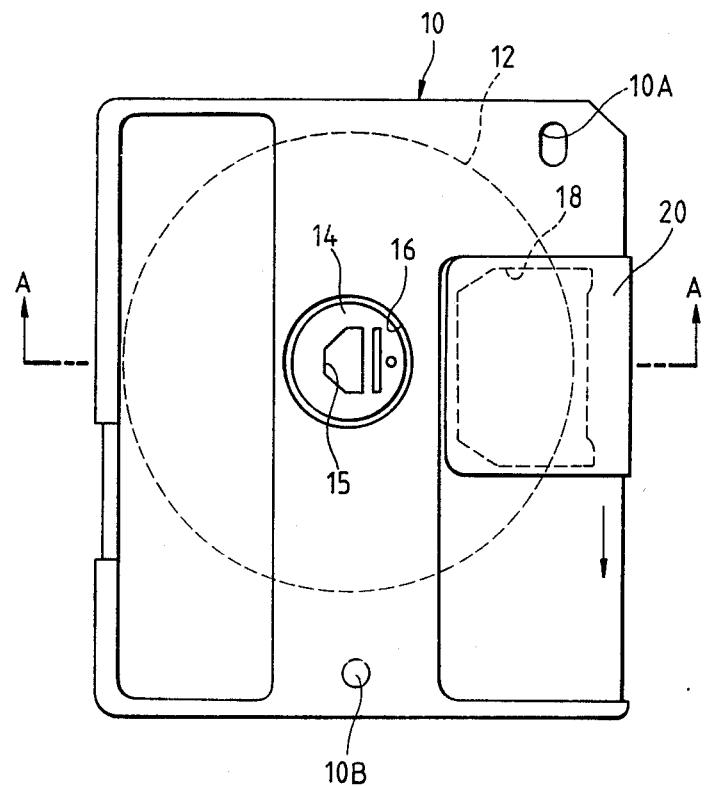
FIG. 2 is a plan view of a magnetic sheet pack used in a magnetic recording/reproducing device containing a rotary magnetic sheet.
Figure 3:
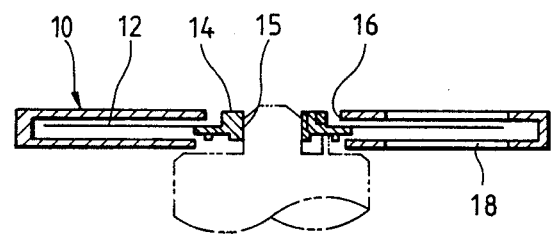
FIG. 3 is a sectional view taken substantially along the line A—A of FIG. 2.

FIG. 2 is a plan view depicting the magnetic sheet pack. FIG. 3 is a sectional view taken substantially along the line A—A of FIG. 2. As illustrated in FIG. 2, the magnetic sheet pack is formed to assume a substantially rectangular shape and contains a magnetic sheet 12 on which still image information or the like is recorded, the magnetic sheet 12 being rotatably provided therein. A center core 14 serving as a reinforcing member is disposed at the center of the magnetic sheet 12. The center core 14 is exposed to outside from a circular opening 16 formed in the magnetic sheet pack 10. The magnetic sheet pack 10 is provided with a window 18 into which the magnetic head is positioned. This window 18 is opened and closed by a slidable shutter 20. More specifically, the shutter 20 serves to close the window 18 before the magnetic sheet pack 10 is inserted into a bucket (not shown), thereby preventing the dust from being adhered to the magnetic sheet 12. When being inserted into the bucket, the shutter 20 moves in the lower direction of FIG. 2 to open the window 18 for the magnetic head, whereby the recording/reproducing process with respect to the magnetic sheet 12 can be performed.

FIG. 4 is a partial sectional view of the rotary magnetic sheet device, showing a relation between the magnetic sheet 12 and the magnetic head 30 to which the present invention is applied. FIG. 5 is an enlarged sectional view showing a contact portion between the magnetic sheet 12 and the magnetic head 30.

Fixed to a base plate 31 is a spindle motor 32 having a rotary spindle 33 by which the magnetic sheet 12 is rotated. Disposed in a position opposing the magnetic head 30 is a regulating plate 34 for regulating configurational variations of the magnetic sheet 12 when the magnetic head 30 protrudes to bend the magnetic sheet 12. The regulating plate 34 is fixed to the base plate 31 through a regulating plate holder 35 and regulating plate holder receiving pins 36a and 36b. If the magnetic head 30 does not protrude, viz., when effecting no recording/reproducing process, a gap a is interposed between the regulating plate 34 and the magnetic sheet 12. However, they are brought into contact with each other in accordance with a protrusion quantity b of the magnetic head 30.

The present invention is applied to the magnetic head 30, and detailed description is given as below with reference to FIG. 6.

The magnetic sheet 12 rotates in a direction shown as a "medium rotating direction" while contacting the magnetic head 30. Simultaneously, the magnetic head 30 slides in a radial (track-width) direction which is orthogonal to the medium rotating direction, with a result that the magnetic sheet 12 is bent in a tent-like shape. (For example, No. 1 to 50 tracks are formed from outside to inside in the magnetic sheet 12.) Therefore, besides size and a configuration, a curvature of a top surface of the magnetic head 30 should be taken into consideration to realize good contact with the magnetic sheet 12.

Figure 6:
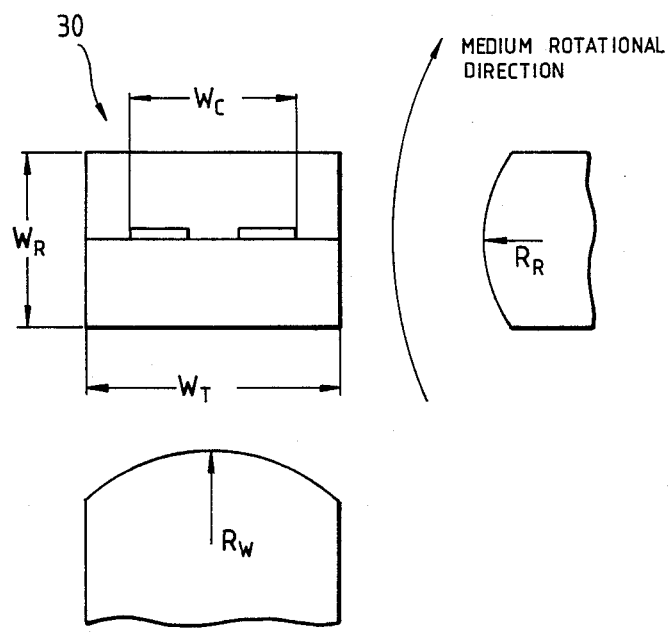
FIG. 6 is an explanatory view showing a configuration and curvatures of a sliding surface of the magnetic head.

As shown in FIG. 6, a head length in the medium rotating direction is denoted by $W_R$; a head length in the track-width (radial) direction, $W_T$; a gap distance, $W_C$; and radii of curvature of the top surface of the magnetic head 30 in the rotating direction and in the track-width direction, $R_R$ and $R_W$, respectively. Table 1 shows detected reproduction outputs with the gap distance $W_C$ being fixed to 160 μm and $W_T$ and $W_R$ being selected as shown in Table 1. The protrusion quantity b was selected to be 0, 20, 40 and 60 μm.

TABLE 1

| $W_T$(μm) | $W_T/W_C$ | $W_R$(μm) | $W_R/W_T$ | Judgement |
|---|---|---|---|---|
| 280 | 1.75 | 280 | 1.00 | X |
| 280 | 1.75 | 170 | 0.61 | |
| 440 | 2.75 | 170 | 0.39 | |
| 448 | 2.80 | 157 | 0.35 | Δ |
| 264 | 1.65 | 157 | 0.59 | |
| 689 | 4.31 | 304 | 0.44 | |
| 667 | 4.17 | 185 | 0.28 | |
| 412 | 2.58 | 700 | 1.70 | X |
| 690 | 4.31 | 690 | 1.00 | X |
| 420 | 2.63 | 185 | 0.44 | |
| 500 | 3.13 | 185 | 0.37 | |
| 500 | 3.13 | 304 | 0.61 | Δ |
| 300 | 1.88 | 170 | 0.57 | |
| 227 | 1.42 | 160 | 0.70 | |

Figure 9:
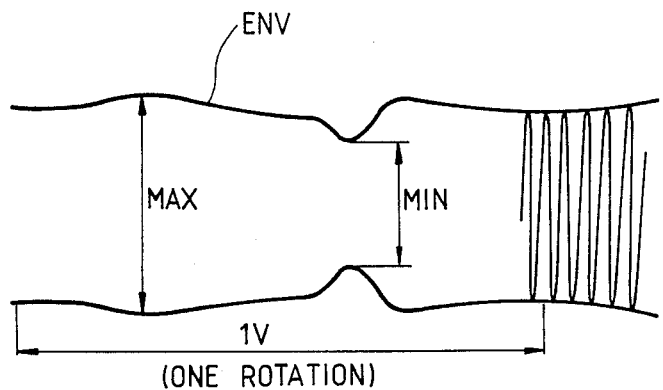
FIG. 9 is an explanatory diagram of an envelope of a reproduced signal.

An example of the reproduction output is shown in FIG. 9, in which "ENV" denotes an envelope of the reproduction output. When varying the protrusion quantity b within a range of 0 to 60 (μm), the judgment mark "O" in Table 1 was given to the case where: within a range of (MIN/MAX of ENV)≧0.75,
 (1) variations in ENV MIN with respect to the protrusion quantity b are small, and
 (2) differences between outputs of the inner and the outer channels are small.

On the other hand, the mark "X" was given to the case where the above conditions (1) and (2) were not satisfied. The mark "Δ" means a border case.

The reproduction output was detected at the track No. 50 (the innermost track) that is under the most severe reproducing condition, and on the basis of the minimum output level (ENVELOPE) above which level the reproduced picture quality is acceptable.

Figure 7:
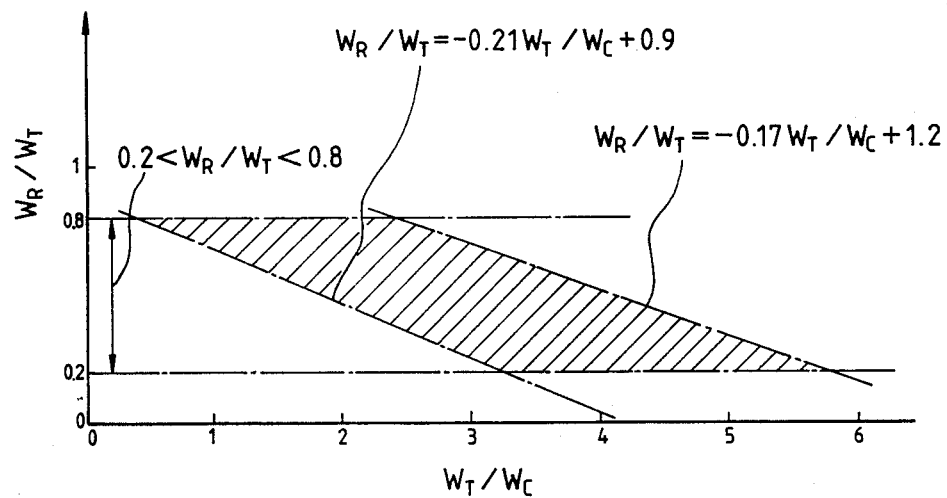
FIG. 7 is an explanatory graph showing an area defined by $W_R/W_T$ and $W_T/W_C$, which gives favorable characteristics.

The results of judgment are expressed in the graph of FIG. 7. Combinations of $W_T/W_C$ and $W_R/W_T$ in which the judgements are marked with "O" or "Δ" prove to exist in the area indicated by oblique lines of FIG. 7.

The description concerning the determination of $W_R$ and $W_T$ is given above. However, it has been proved that selection of $R_W$ and $R_R$ and selection of the protrusion quantity b are important for the purpose of obtaining the good reproduction output.

That is, by detecting the reproduction outputs in the same manner as mentioned above with selecting a value of $R_W$, it has been clarified that the favorable outputs can be obtained when $R_W$ is equal to or less than 22 mm and also $R_R$ is equal to or less than 14.5 mm. Besides, it has become clear that when a ratio of $R_W$ to $R_R$ falls within a range shown in table 2, the most favorable reproduction outputs can be obtained and the useful range of the protrusion quantity b becomes broad.

TABLE 2

| $R_W$ (mm) | $R_R$ (mm) | $R_W/R_R$ |
|---|---|---|
| 22 | 14.5 | 1.5 |
| 15 | 5 | 3 |
| 22 | 5 | 4.4 |

Namely, when a ratio of $R_W/R_R$ is selected to be within a range from 1.5 to 4.4, the magnetic head of 2CH can contact with the magnetic sheet under a good condition, thereby obtaining the favorable reproduction outputs.

Because of contacting with the magnetic sheet 12 the sliding surface of the magnetic head 30 is subjected to some abrasion. It is required to increase a life of the magnetic head 30 that an amount of abrasion be reduced.

In the light of this point, the above-described selection rule of $W_T$ and $W_R$ has been proved to be remarkably effective.

Figure 8:
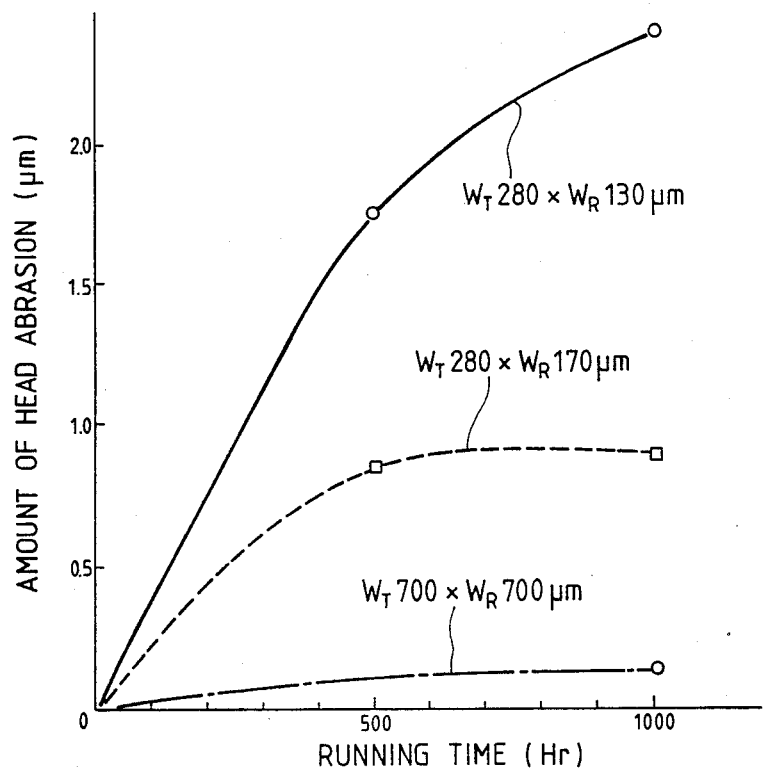
FIG. 8 is a graph showing a relation between abrasion and a running time with the curvatures of sliding surface as parameters.

As illustrated in FIG. 8, if the selection is made with a condition that $W_T=280$ μm or more and $W_R=170$ μm or more, the amount of abrasion of the magnetic head 30 can be reduced to less than 1 μm even after it has been used for 1,000 hours. (The amount of abrasion shown in FIG. 8 is an average of those of the inner and outer channels.) Thus, a considerable diminution in abrasion can be attained.

As discussed above, in the magnetic head according to the present invention, the size and the shape of the sliding surface of the magnetic head is thoroughly determined with taking such conditions as the distance between the magnetic gaps and the protrusion quantity of the magnetic head into consideration. Hence, the favorable state of contact between the magnetic head and the magnetic sheet can be obtained.

Although the illustrative embodiment of the present invention has been described in greater detail with reference to the accompanying drawings, it is to be understood that the invention is not limited to the precise embodiment. Various changes or modifications may be effected therein by one skilled in the art without departing from the scope or the spirit of the invention.

What is claimed is:

1. A magnetic head for recording information into and reproducing information from a rotational magnetic recording medium with said magnetic head being in contact with said magnetic recording medium, comprising:
   a pair of magnetic gaps; and
   an external configuration of said magnetic head in which defining $W_R$ and $W_T$ as lengths of said magnetic head in a rotational direction and in a track-width direction of said magnetic recording medium, respectively, and $W_C$ as a distance between said pair of magnetic gaps, $W_R$, $W_T$ and $W_C$ satisfy formulas of:

$$0.2 < W_R/W_T < 0.8$$

and $$-0.21 W_T/W_C + 0.9 < W_R/W_T < -0.17 W_T/W_C + 1.2.$$

2. A magnetic head as claimed in claim 1, wherein said rotational magnetic recording medium is a magnetic sheet.

3. A magnetic head as claimed in claim 1, further comprising:
   a contact surface of said magnetic head with said magnetic recording medium in which defining $R_W$ and $R_R$ as radii of curvatures of said contact surface in said track-width direction and in said rotational direction of said magnetic recording medium, respectively, $R_W$ and $R_R$ satisfy a formula of:

$$1.5 < R_W/R_R < 4.4.$$

4. A magnetic head as claimed in claim 3, wherein said rotational magnetic recording medium is a magnetic sheet.

* * * * *